United States Patent [19]
Abbott

[11] 3,990,034
[45] Nov. 2, 1976

[54] TOWABLE VLF SONAR PROJECTOR
[75] Inventor: Frank R. Abbott, San Diego, Calif.
[73] Assignee: The United States of America as represented by the Secretary of the Navy, Washington, D.C.
[22] Filed: Apr. 23, 1975
[21] Appl. No.: 570,674

[52] U.S. Cl. ............................. 340/7 R; 181/113; 340/8 R
[51] Int. Cl.² .......................................... G01V 1/00
[58] Field of Search ................... 340/7, 8, 9, 10, 11; 181/113, 114

[56] References Cited
UNITED STATES PATENTS

| | | | |
|---|---|---|---|
| 3,346,841 | 10/1967 | Weichart | 340/7 R |
| 3,932,835 | 1/1976 | Abbott | 340/7 R |

Primary Examiner—Stephen J. Lechert, Jr.
Attorney, Agent, or Firm—Richard S. Sciascia; Ervin F. Johnston; Thomas Glenn Keough

[57] ABSTRACT

A transverse variable reluctance transducer of acoustic energy is configured to lend itself to being towed through the water while it radiates acoustic energy. Its elongate, cylindrical shape, which has an axial tunnel running its length, allows the flow of cooling water to prevent excessive heat from building up. The transducer's linear vibrator motor has its outer shell windings DC excited while the inner core or reciprocator has its windings AC excited. As the AC source is changed from one frequency range to another, responsive changes in the projected acoustic signal are radiated from suitably interconnected projection surfaces. In one configuration, one of the projection surfaces is in communication with the fluid flowing through the axial tunnel at one end of the transducer and another projection surface faces radially outwardly from the transducer's opposite end. Another configuration has both of these projection surfaces facing radially outwardly at opposite ends of the transducer. In both of these configurations the projection surfaces do not interfere with the towing or the cooling of the transducer. Both of these transducers have projection surfaces which are uniquely coupled to the vibration motor so as to magnify the amplitude of their radial displacement with respect to the axial excursions of the motor. Another variation of this inventive concept employs the same motor with the reciprocator coupled to one side of a series of axially aligned discs while the stator is coupled to the other side.

23 Claims, 13 Drawing Figures

TOWABLE VLF SONAR PROJECTOR

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

Transducers of acoustic energy in a water medium have undergone a continuing evolution. Ferroelectric stacks have been used to drive piston or trains of ferroelectric elements have been used in long line arrays. Although there are a few exceptions, the ferroelectric elements seems to be more suited to operation in higher frequency ranges. Water hammers which sequentially interrupt the flow of an impelled fluid have been used by scientists when a low frequency sound source is called for. Somewhat better results have been obtained in the lower frequency spectrum, i.e. in the frequency band lying below 100 Hz, by using a magnetomotive motor driven transducer. One noteworthy design, "Transducer," disclosed in U.S. Pat. No. 3,126,520 by Frank R. Abbott, employed a magnetomotive diver motor over the mid-range of 100 Hz to several thousand Hz. The left and right hand pistons radiated this mid-range of acoustic energy by the magnetic interaction of AC and DC plates. Another design is the "Electrodynamic Transducer," of U.S. Pat. No. 3,353,040 also invented by the present invention, Frank R. Abbott. Stator and armature poles are mounted respectively on two concentric cylinders and bifilar windings are wound upon the two sets of poles. The sets of poles are excited by a DC signal and by an AC signal and the armature and interconnected piston face reciprocate at the same frequency as the applied AC signal. Still another electromechanical transducer called the "Electrodynamic Sonar Projector," U.S. Pat. No. 3,605,080 by Frank R. Abbott used magnetized ridges on an armature which is driven by a stator having interspursed AC and DC windings. In the frequency band below 100 Hz it functioned satisfactorily, yet this transducer, like its two predecessors, did not lend itself well to being towed through the water. Their bulk and lack of symmetry restricted their being used, for example, by scientists interested in mapping the marine topography by observing reflected signals over an extended area. Thus, there is a continuing need in the state-of-the-art to provide a high energy, low frequency transducer which is capable of being towed through the water while ensonifying the surroundings.

SUMMARY OF THE INVENTION

The present invention is directed to providing a transducer of acoustic energy in a water medium. A means for inducing a first magnetic field is mounted on the inner surface of a cylindrically shaped housing. A means for inducing a second magnetic field is mounted on the outer surface of a tubularly shaped member which is concentrically carried within the cylindrically shaped housing. The housing and the tubular member are coupled at opposite ends to a pair of cylindrically shaped projection surfaces or they extend to several pairs of disc shaped projection surfaces resiliently coupled to one another around their periphery.

It is a prime object of the instant invention to provide an improved transducer of acoustic energy.

Yet another object of the invention is to provide a transducer of acoustic energy having a configuration which lends itself to be towed through the water.

Still another object of the invention is to provide a high energy projector of acoustic energy designed to allow the flow of ambient water over it and through it for cooling.

Still another object of the invention is to provide a magnetomotive transducer of acoustic energy employing magnetically interacting fields of flux generated by an alternating current and a direct current.

Another object of the invention is to provide an elongate, stove-pipe shaped transducer having one projection surface facing radially inwardly at one end and another acoustic energy projection surface facing radially outwardly at its opposite end.

Another object is to provide a stove-pipe shaped transducer of acoustic energy having two radially outwardly facing acoustic energy projection surfaces disposed at opposite ends.

Yet another object is to provide a transducer of acoustic energy in which either radially inwardly or radially outwardly facing acoustic energy projection surfaces are fabricated to effect an increased radial displacement with respect to the axial excursions of its interconnected magnetomotive motor.

Still another object of the invention is to provide a transducer of acoustic energy having a lower cost of fabrication due to the inclusion of continuously extending helical strips which serve as magnetic poles.

Still another object of the invention is to provide a transducer which is less prone to heat and overload, due to the of mounting of helically extending poles on the stator and the reciprocator on highly magnetic cyclinders.

These and other objects of the invention will become more readily apparent from the drawings when taken with the ensuing description.

DESCRIPTION OF THE PREFERRED EMBODIMENT

Figure 1:
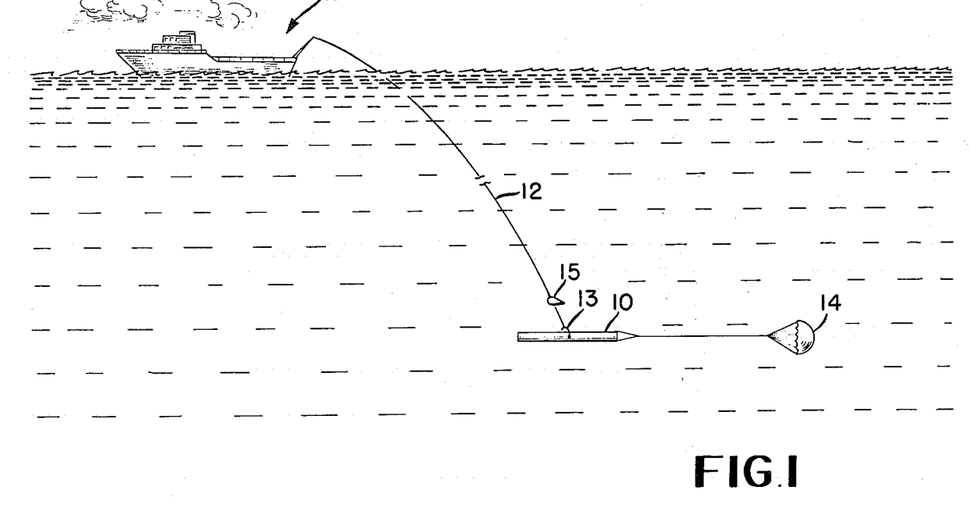
FIG. 1 is an isometric depiction of the invention being towed.

Referring now to FIG. 1 of the drawings, a transducer 10 embracing the inventive concept of this invention is being towed through the water by a surface craft 11 via a towing cable 12. The towing cable is joined to a yoke 13 connected at diametrically opposed projections forward of the transducer's centroid. A drogue chute 14 is connected to the trailing end of the transducer and serves to orient the transducer in the direction that the surface craft is moving.

While a surface craft having a relatively short length of towing cable is depicted, submersibles or great lengths of towing cables optionally are used to fit the particular task at hand. Irrespective of what towing mode is chosen, it has been found expedient, however, to couple the towing cable via the towing yoke as shown and connecting a drogue chute to prevent restricting the flow of cooling water through and around the transducer. Additionally, the radiated acostic energy is not baffled as it emanates from the opposite ends of the transducer. Elaboration of both of these points will follow.

An AC power supply is carried onboard the surface craft and power lines reached down to the transducer. Because, usually, there are less losses associated with the transmission of high voltage AC power, a transformer and a full wave rectifier circuit may be carried in a faring 15 located near the transducer. From the rectifier circuit DC as well as AC power is fed to the active element in the transducer, a magneto motor 16. The magnitude of the power delivered to the motor has approached a 10 kilowatt level.

Noting FIGS. 2 through 5, motor 16 is shown as it is mounted on a cylindrically shaped housing 17 and a tubular armature or reciprocator 18. The motor functions in accordance with the "Electrodynamic Transducer" of U.S. Pat. No. 3,353,040 and, similar to that transducer, helically extending stator poles 19 and helically extending reciprocator poles 20 run the length of the motor. The poles optionally are fabricated from a silicon or nickel iron alloy although low carbon steel sheets can function to a degree of success. Interposed between the stator poles and reciprocator poles are helically extending stator windings 21 and helically extending reciprocator windings 22. Note that the term stator does not necessarily imply less vibratory motion of the outer shell than of the inner reciprocator or armature core. The two sets of windings are bifilar windings of the type fully described in the cited patent. The helically extending stator poles, for example, have grooves which are bifilar in nature. That is, the lead of the spiral is equal to twice the pitch. By doubling-back the conductors of the windings after one set of grooves has been wound one turn, and returning them in the adjacent groove, current is made to flow opposite directions in the adjacent grooves.

Figure 3A:
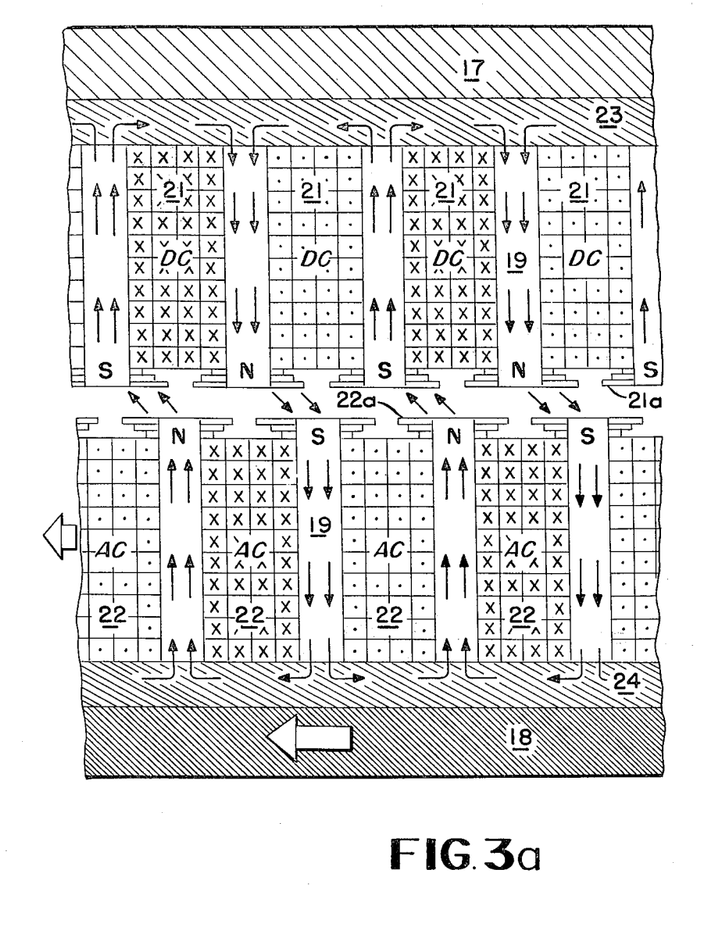
FIG. 3a schematically depicts a portion of the magneto motor at one extreme excursion.
Figure 3B:
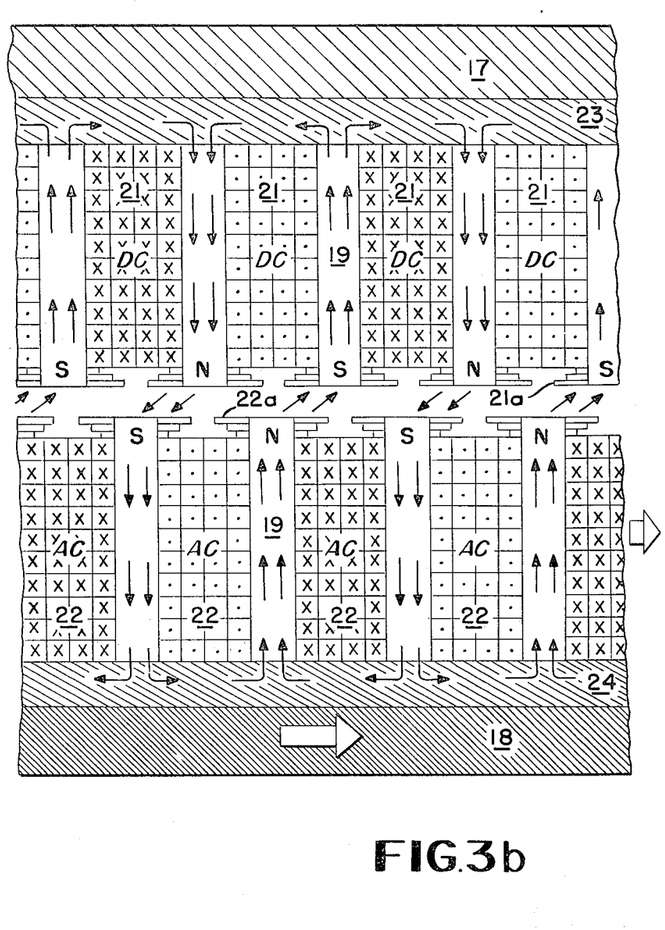
FIG. 3b schematically depicts a portion of the magneto motor at the opposite extreme excursion.
Figure 4:
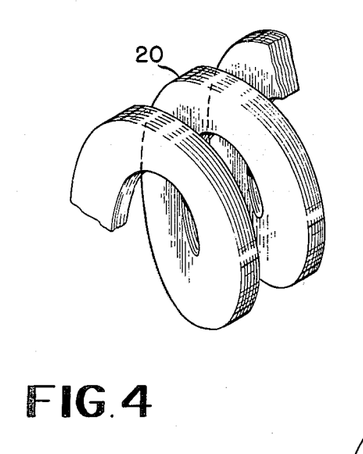
FIG. 4 shows an isometric view of a portion of the helically extending poles.
Figure 5:
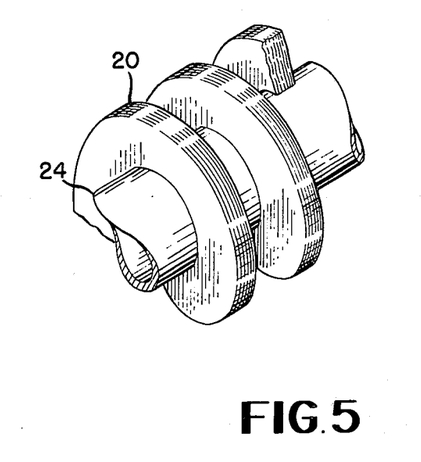
FIG. 5 depicts a portion of the helically extending poles mounted on a cylindrically shaped shell formed of highly magnetic metal laminations.

In one embodiment of the invention, 40 turns of American Wire Gage number 9 or 10 aluminum wire were selected. This polyamid insulated square conductor in the 55 hundredths of an inch grooves provided over 2,000 ampere turns of magnetomotive force when driven at the 2½kilowatt level. Over 800 newtons force is generated by eight side-by-side poles, see FIG. 3.

As in the cited patent, a DC potential is applied to either the stator windings or the reciprocator windings and an AC potential is applied to the other. Since the large DC current produces more heat, it is expedient to apply to DC potential to the stator poles or outer shell since there is a larger area of cylindrically shaped housing 17 in contact with the ambient, cooling water.

The device of this invention differs from that of the cited patent by its inclusion of modified helically extending poles 19 and 20. That is, in the cited patent a great many comb shaped longitudinal laminations were punched out and arranged to form the poles of that motor. Each lamination cost approximately twenty-five cents per unit. The present invention greatly reduces the cost by having six, 25 thousandths of an inch thick laminations extend the length of the motor to define eight poles on each the stator and reciprocator.

Each of the laminations have the appearance of a "Slinky" toy and they are bonded together by a suitable dielectric adhesive. The end product is that the stator and reciprocator poles reduce the problems associated with excessive current losses. In addition, the poles can be fabricated to define deep grooves between them so that many conductors or large current carrying conductors can induce strong magnetic fields.

Figure 2:
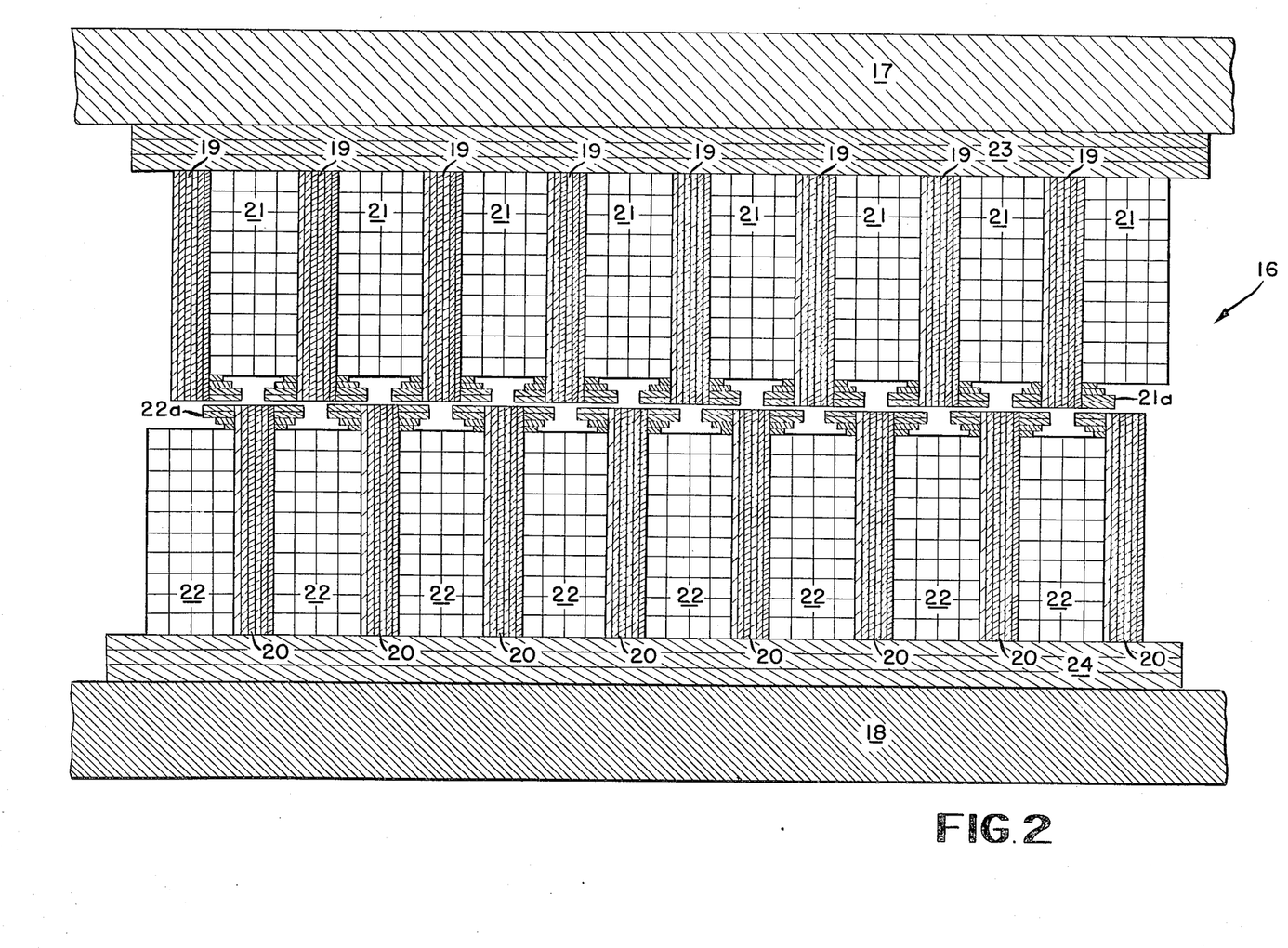
FIG. 2 sets forth, in schematic form, a cross-sectional view of a portion of the magneto motor.

It is a well known fact that a considerable eddy current loss is created where the magnetic flux path makes a sharp turn as where the flex makes right angle turn into a flat sheet. In this invention the eddy current losses are limited to a tolerable level by inclusion of cylindrically shaped magnetic alloy 23 and 24 onto which the stator poles and the reciprocator poles respectively are bonded. Fashioning these results from a laminate of highly magnetic metal of high electrical resistivity such as a nickle iron or a silicon iron alloy, helps minimize eddy losses, since the iron alloy shell provides as "easier" flux path. While only three layers are shown in FIG. 2. Reduction of eddy currents and the consequent heat and permitted the use of higher driving powers and the resultant transmission of higher levels of acoustic energy.

Although the cited patent thoroughly explains the electromagnetic coaction to reciprocate the motor, a brief explanation is felt to be in order.

In the schematic illustration of FIG. 3a and 3b, the laminations of the helically extending stator and reciprocator poles have been deleted so as to allow the portrayal of the magnetic flux paths between the stator and reciprocator by the small arrows. It is to be understood that, in practice, these poles are laminated.

Looking to FIG. 3a, a small section of the magneto motor is shown, it being understood that the same phenomena is occurring throughout its length. The eight poles the stator and reciprocator of a prototype of the magnetostrictive motor reach nearly one meter in length. Radially separating the reciprocator poles from the stator poles about one millimeter gives a power output of nearly eight hundred newtons. Including pole strips 19a and 20a shortens the flux path in air and allows a fringing flux zone to be created over longer reciprocal excursions. This is particularly important since in a motor of this type it has been discovered that it takes about one thousand ampere turns to bridge a 1 millimeter air gap. The closeness of the poles and the pole strips ensures more efficient operation.

Noting FIG. 3a a DC potential is applied to stator windings 21, and an AC potential is fed to reciprocator windings 22. The flux paths established by the DC winding as shown, create a series of north and south poles on stator poles 19. The AC potential, in the positive portion of its cycle, sets up its own series of alternating north and south poles on reciprocator poles 20. There is an attraction between sets of north and south poles and reciprocator 18 is drawn to the left as indicated by the large arrow.

When the Ac current swings to the negative portion of its cycle, the flux paths change and there is an opposite attraction which pulls reciprocator 18 to the right, as shown by the large arrow in FIG. 3b. This left and right excursion is at the same frequency as the AC current and, consequently the radiated frequency of the transducer is a direct function of the applied AC signal.

Figure 6A:
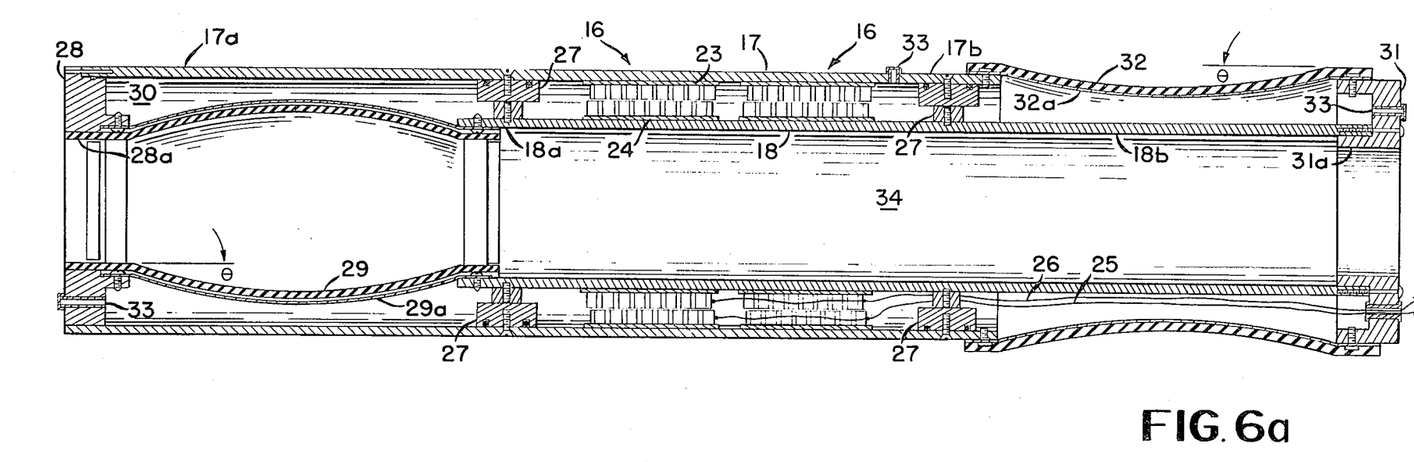
FIGS. 6a, 6b, and 6c show one embodiment of the transducer in the neutral, extreme left and extreme right positions.
Figure 6B:
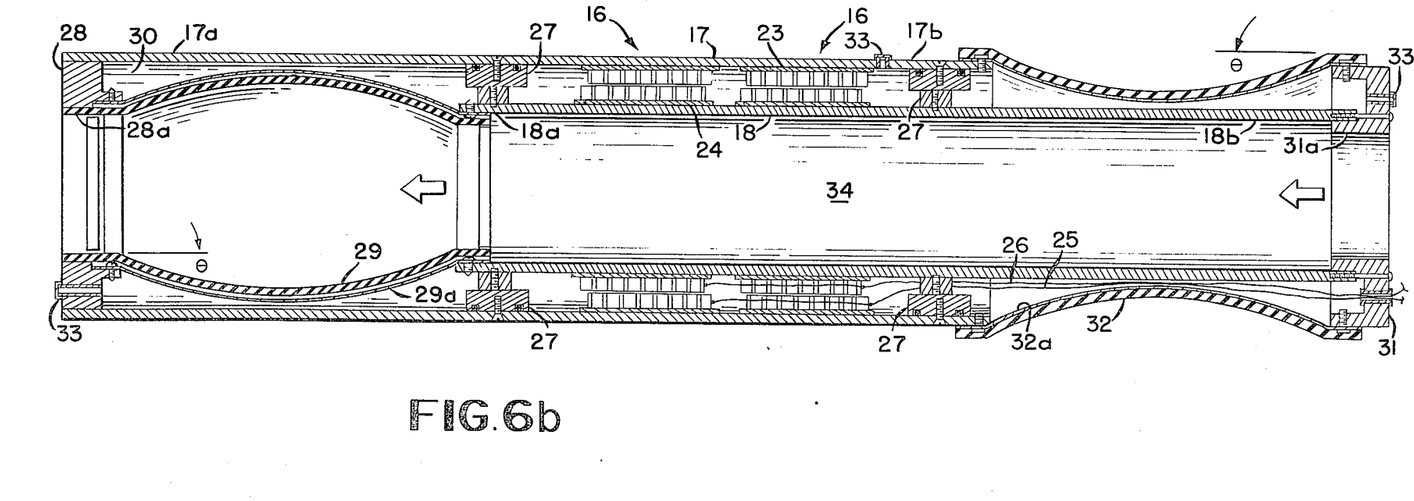
Figure 6C:
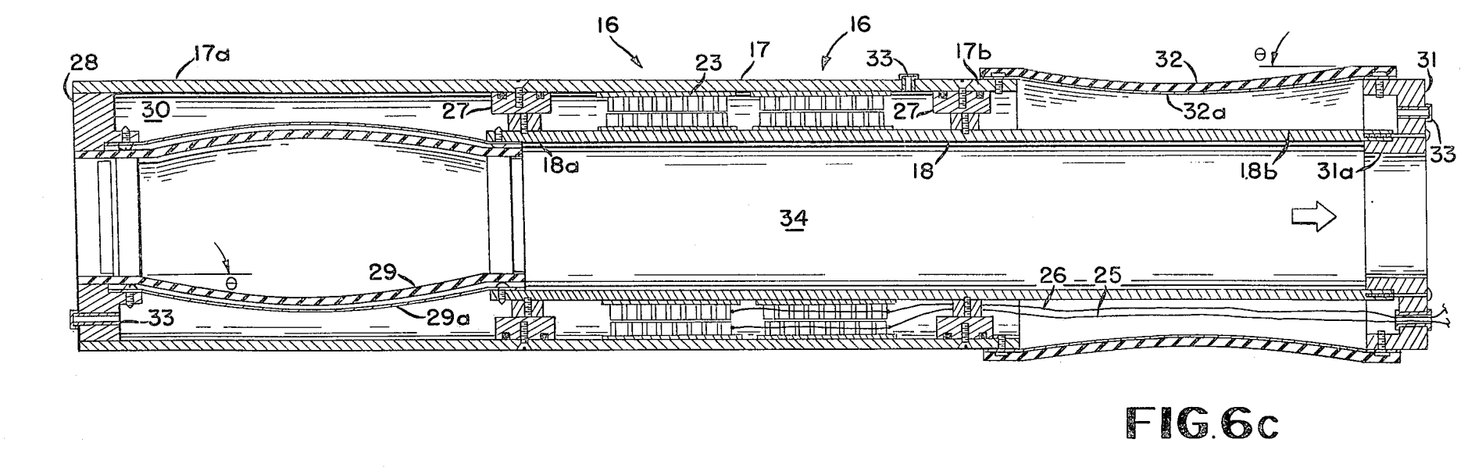

Looking to FIGS. 6a, b, and c, a first embodiment of the invention employes two magneto motors 16 to bidirectionally displaces reciprocator 18 with respect to housing 17. The motors are driven by the power source via lends 25 and 26 which feed DC power current to stator poles 19 and AC power to reciprocator poles 20. Of course, the two motors are electrically coupled so that their force is additive and not in opposition.

A pair of annular bearings 27 seal the chamber in which the motors are contained and also hold the housing and the reciprocator together. The bearings are made up of an inner and an outer portion, the inner portion being sintered, porous bronze soaked in oil while the outer bearing is anodized aluminum. Optionally, a teflon bearing is substituted when the outer surfaces of the reciprocator and the inner surface of the housing are hard annodized.

An extension 17a of the housing 17 reaches out to an annular cap member 28. The cap member is provided with an opening 28a for allowing the free passage of cooling water through the transducer as it is pulled through the water.

Coupled between end 18a of the reciprocator and the cap member, a rubber boot 29 or sleeve seals an annular chamber 30. A plurality of bowed strips 29a longitudinally extend between the cap member and end 18a and collectively contain the rubber boot.

In cross section, it is seen that the boot bulges outward and assumes a "sagging clothesline" configuration. When reciprocator 18 undergoes an excursion to the right it will cause a magnified pulling in of the walls of the rubber boot. It has been found that a maximum angle of depression Θ of 22½° would give a two-to-one magnification in amplitude. That is to say, for each unit reciprocator 18 moves to the right in the axial direction the rubber boot moves radially inwardly two units. The encompassing bowed strips assure the magnified radial deflection of the boot.

In like manner, on an extension 18b of reciprocator 18, an annular cap member 31 provided with an opening 31a for cooling acts on a slightly differently shaped rubber boot 32. This boot has its outer surface having a generally concave cross-sectional configuration whereas rubber boot 29 had a slightly convex configuration. Bowed strips 32a ensure responsive axial travel of the rubber boot since they are connected at opposite ends to end 17b and cap member 31. Here again, an angle Θ equals approximately 22½° to give a maximum two-for-one amplification of the reciprocal motion as reciprocator 18 forces extension 18b to the right. In other words, rubber boot 32 and bowed strips 32a are displaced radially outwardly approximately twice as much as the distance that reciprocator 18 travels.

Between rubber boot 27 and the inner surface of extension 17a and between rubber boot 32 and the outer surface of extension 18b two gas-filled projection surface chambers are formed. These chambers improve the operational capabilities of the transducer. Fittings 33 communicating with the motor chamber and to both projector surface chambers permit the pressure equalization of all the chambers with the surroundings. Optionally, a source of pressurized gas and an automatic sensor, both being well within the state of the art, are mounted in fairing 15 and tubing passes pressurized gas to the several chambers of the transducer when needed.

It should be noted that in this configuration of the invention a passageway or tunnel 34 is provided which runs the entire length of the transducer. As the transducer is pulled through the water, cooling water flows along the inner surfaces of reciprocator 18. At the same time, water flows over the outer surfaces of housing 17. Together the two surfaces transfer a good portion of the heat generated by the magneto motors to the water and allow higher driving powers to radiate higher levels of acoustic energy.

A second embodiment of this transducer uses the magneto motor 16 referring to above. Here, however, notice that a single motor has been used and the power output of this embodiment is not quite as great as that of the embodiment of FIG. 6. By using only one or coupling several motors in tandum, a designer is free to adapt to a variety of situations and great latitude is thereby provided for.

Figure 7A:
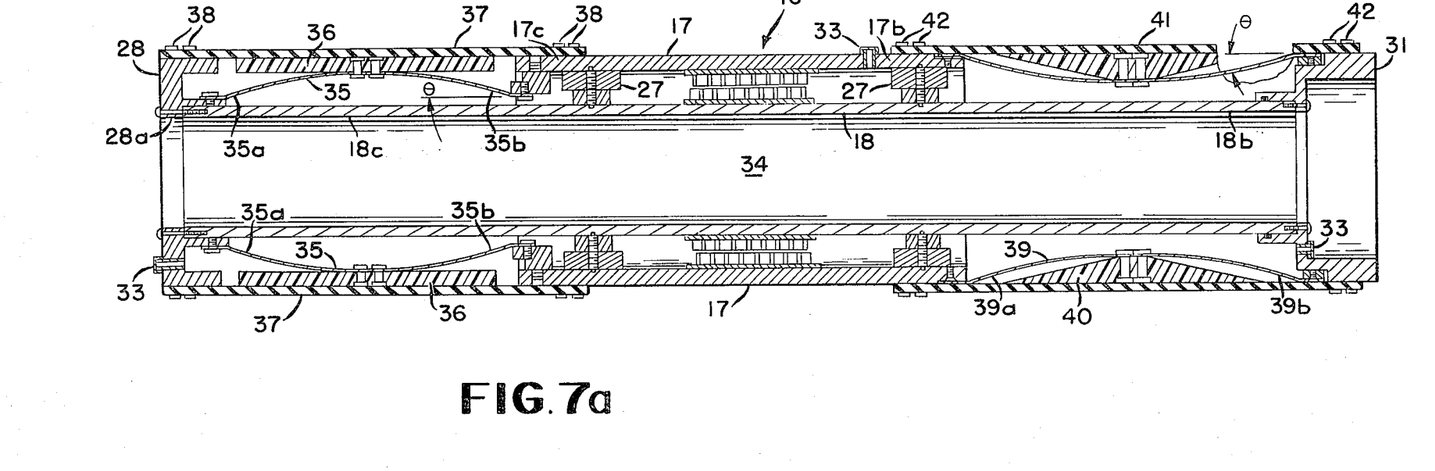
FIGS. 7a, 7b, and 7c show another embodiment of the transducer in the neutral, extreme left and extreme right positions.
Figure 7B:
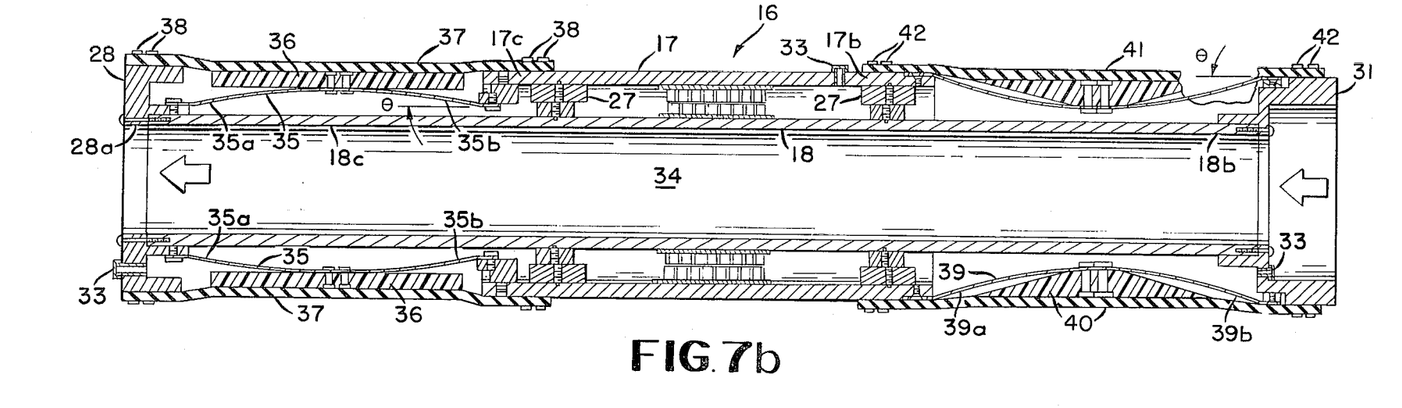
Figure 7C:
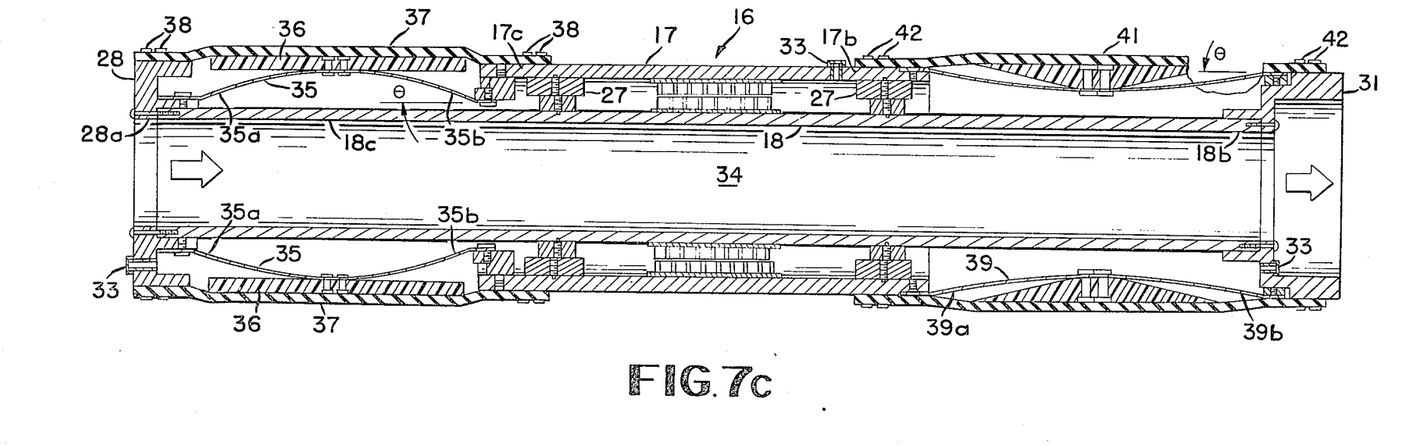

In the embodiment of FIGS. 7a, 7b and 7c, like reference characters are given to identical structural elements but the AC and DC leads and fittings have been deleted to avoid cluttering the drawings. The difference between this embodiment and the one just described is that two different mechanical assemblies are used to project acoustic energy radially outwardly from the transducer. Another extension 18c terminates in a slightly differently configured annular end cap 28. The cap also is provided with an opening 28a which allows the passage of cooling water through the transducer.

A plurality of bowed members 35 are anchored at their opposite ends 35a and 35b to annular cap member 28 and end 17c, respectively. The bowed members are arranged in side-by-side relationship extending between the cap and housing member in a 360° relationship. Each of the bows is coupled to an elongate strip 36 which longitudinally extends to form an outer surface which roughly defines a portion of a composite cylindrical surface. A cylindrically shaped rubber boot 37 is placed around the elongate strips. When hose clamps 38 are tightened at opposite ends of the boot, a watertight projection chamber is created between the rubber boot and the outer surface of extension 18c.

It can be seen that when extension 18c is displaced to the left, bowed members 35 pull the elongate strips inwardly. Since rubber boot 37 holds the elongate strips in slight compression, it collapses inwardly. Like the embodiment described above, having the angle Θ equal to approximately 22½° causes a two-for-one amplification of the radially inwardly and outwardly motion of elongate strips 36 as compared to the reciprocal excursions or reciprocator 18.

At the opposite end of the transducer a plurality of bowed members 35 are secured at their opposite ends 35a and 35b to end 17b of housing 17 and cap member 31, respectively. It becomes apparent from an inspection of FIGS. 7a, b and c, that bowed members 39 are connected oppositely to the connection of bowed members 35. This manner of interconnection will be elaborated on below, but let it suffice to say at this point that it is done to enable the simultaneous radial outwardly motion of the projection surfaces and the simultaneous radially inwardly motion of the projection surfaces.

Elongate rigid strips 40 are joined to the bowed members 39 and a rubber boot 41 covers the strips. When hose clamps 42 are tightened, a watertight projection chamber is created between the rubber boot and the outer surface of extension 18b. Again, an angle Θ equal to 22½° bought a two-to-one amplification of the radial displacement of the strips as compared to the reciprocal excursions of the reciprocator 18.

In operation, as reciprocator 18 undergoes an excursion to the left in accordance with an applied signal, cap member 28 pulls on ends 35a of each of bowed members 35. Since ends 35b are anchored to the relatively immobile housing 17, each bowed member tends to become straightened, forcing elongate strips 36 and rubber boot 37 inwardly.

Simultaneously, at the opposite end of the transducer, the excursion to the left by extension 18b tends to bow bowed members 39 to a greater degree because ends 39b are anchored to annular member 31 and ends 39a are secured to the relatively immobile housing 17. This greater degree of bowing draws the elongate strips 40 inwardly along with rubber boot 41.

Thus, there has been a simultaneous radially inwardly motion by the projection surfaces defined by the outer surfaces of boot 37 and boot 41, see FIG. 7b.

As the applied signal forces reciprocator 18 on an excursion to the right, there is a compression of bowed members 35 between cap member 28 and housing 17. The bowed members force their interconnected, elongate strips radially outwardly along with covered rubber boot 37. Simultaneously, the excursion to the right of extension 18b causes annular cap member 31 to exert a tensile force on bowed members 39 which are held between the cap and housing 17. Their associated rigid strips 40 are displaced radially outwardly along with covering boot 41. This creates a simultaneous radially outwardly excursion by the two projection surfaces defined by the outsides of the rubber boots when reciprocator 18 undergoes an excursion to the left.

Figure 8:
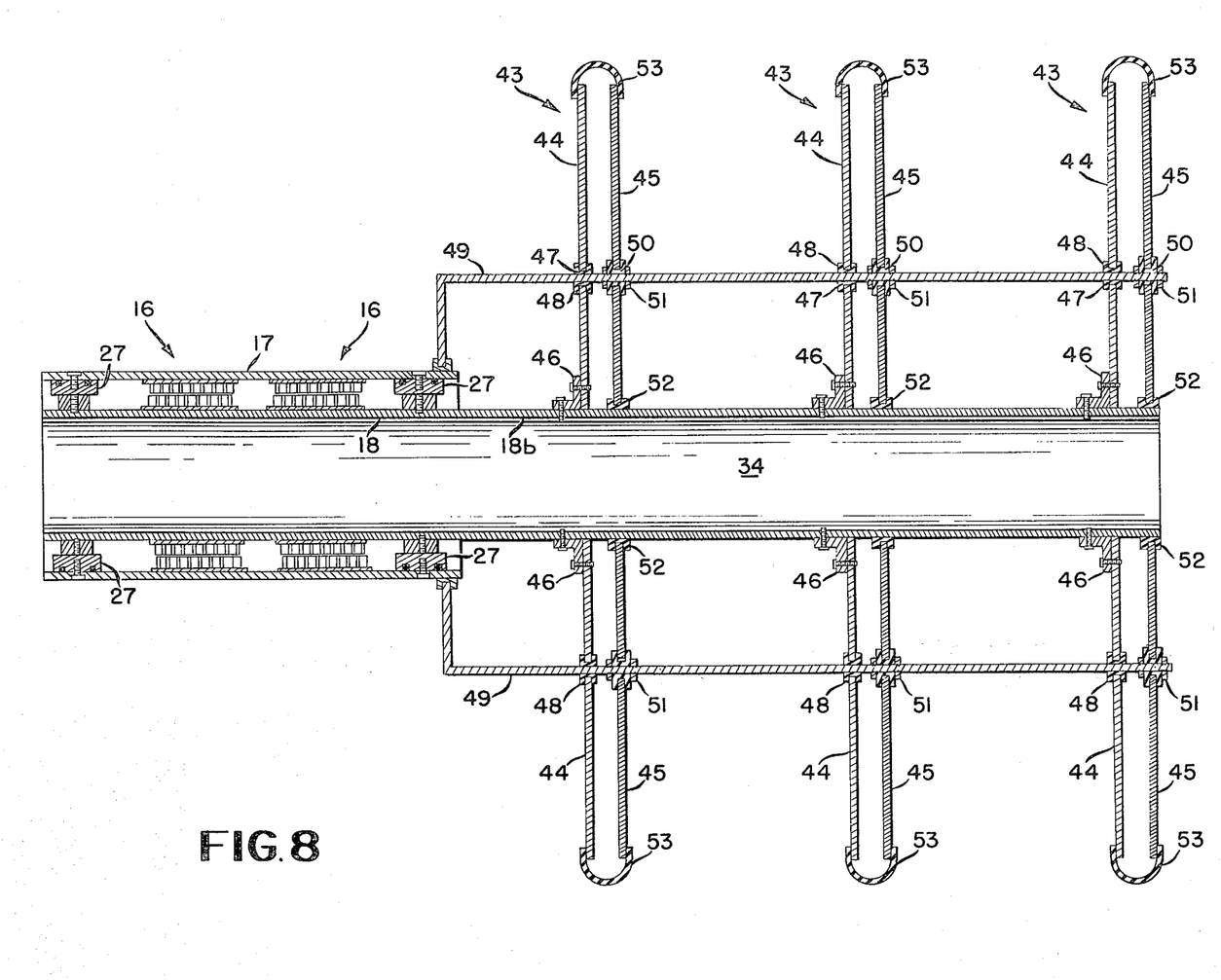
FIG. 8 shows yet another embodiment of the transducer in the neutral position.

Another embodiment in the invention is shown in FIG. 8. Here, like elements are given like reference characters as in the previous embodiments. Two motors 16 to redemonstrate the flexibility the designer has with the transducer of this invention. Power availability, output levels desired and a variety of other parameters easily accommodated by this invention.

In the embodiment of FIG. 8, extension 18b is made longer and a series of radiation assemblies 43 are mounted upon it. Each assembly includes a first disc 44 and a second disc 45. Each of the discs 44 is connected onto extension 18b by a suitable flange coupler 46 which is bolted or otherwise suitably affixed onto the extension and the disc.

A pair of openings 47 and associated seals 48 are provided in the first discs to allow the passage of several drive rods 49 anchored to the outer surface of cylindrically shaped housing 17. The drive rods extend through another pair of openings 50 in the second discs and are bolted to the second discs by a sealed, threaded coupler 51.

An annular seal 52 is provided on the second disc to accommodate the relative motion of extension 18b as it undergoes its reciprocal excursions. A resilient or compliant annular seal 53 is bonded onto the outer rims of both discs to seal a ring-shaped chamber in each assembly. It can be seen that the high driving force offered by the magneto motors individually or in combination, can be effectively coupled to the water medium by the several juxtaposed radiation assemblies. The net amount of power that such an assembly can radiate can vary.

Obviously, many modifications and variations are possible in the light of the above teachings, and, it is therefore understood that within the scope of the disclosed inventive concept, the invention may be practiced otherwise than as specifically described.

What is claimed is:

1. A transducer of acoustic energy in a water medium comprising:
   means for inducing a first magnetic field;
   means for inducing a second magnetic field disposed adjacent and concentrically inwardly from the first magnetic field inducing means;
   means connected to the first magnetic field inducing means for housing it and the second magnetic field inducing means;
   means concentrically disposed inside the second magnetic field inducing means and coupled thereto for extending beyond the axial dimensions of the housing means; and
   means coupled between the ends of the housing means and extending means for projecting acoustic energy as the extending means undergoes reciprocal excursions in response to electromagnetic interaction of the first and second magnetic field inducing means.

2. A transducer according to claim 1 in which the extending means is provided with an axial duct for receiving cooling water therethrough.

3. A transducer according to claim 1 further including:
   a yoke and line coupled to the transducer for pulling the transducer through the water to ensure the passage of the cooling water.

4. A transducer according to claim 3 further including:
   a source of DC potential coupled to the first magnetic field inducing means to induce a steady state magnetic field and
   a source of AC potential coupled to the second magnetic field inducing means to induce an alternating magnetic field to permit the reciprocal excursions.

5. A transducer according to claim 4 in which the first magnetic field inducing means functions as the stator of a reciprocal motor and includes a pair of adjacent helically extending laminations sandwiching bifilar windings and the second magnetic field inducing means functions as the moving member of a reciprocating motor and includes a pair of adjacent helically extending laminations sandwiching bifilar windings magnetically with the stator to create the reciprocal excursions.

6. A transducer according to claim 5 in which the housing means is a cylindrically shaped shell and the extending means is a thin walled tube which together define a cylindrical cavity in which the reciprocal motor is contained.

7. A transducer according to claim 6 further including:
   means disposed at opposite ends of the cylindrical cavity for sealing the reciprocal motor therein.

8. A transducer according to claim 7 in which the projecting means is shaped to translate the reciprocal excursions into responsive magnified radial displacements.

9. A transducer according to claim 8 further including:
means coupled between the cylindrically shaped shell and the projecting means and the thin walled tube means and the projecting means for ensuring the radial displacements of the projecting means in response to the reciprocal excursions of the extending means.

10. A transducer according to claim 9 in which the ensuring means is a pair of end caps, each provided with a passageway to allow the flow of cooling water therethrough.

11. A transducer according to claim 10 in the projecting means is a pair of elongate sleeves of a flexible material, one mounted between the projection means and the ensuring means in fluid communication with said axial duct to ensure a continuing passage of cooling water therethrough and with its acoustic energy projecting surface facing radially inwardly and the other one is mounted between the housing means and the ensuring means with its acoustic energy projecting surface facing radially outwardly.

12. A transducer according to claim 11 in which one of the flexible sleeves is mounted to define a chamber between itself and an extension of the cylindrically shaped shell and the other flexible sleeve is mounted to define another chamber between itself and an extension of the thin walled tube to ensure the responsive transmission of acoustic energy.

13. A transducer according to claim 8 further including:
means coupled between the projecting means and the extending means at its opposite ends for ensuring the radial displacements of the projecting means in response to the reciprocal excursions of the extending means.

14. A transducer according to claim 13 in which the ensuring means is a pair of end caps, each provided with a passageway to allow the flow of cooling water therethrough.

15. A transducer according to claim 14 in which the projecting means is two sets of projection strips each set arranged in a side by side relationship to form a cylindrical projection surface, the projection strips are configured with arcuate portions secured at opposite ends to the opposite ends of the cylindrically shaped shell and the end caps to provide the radially magnified displacements of the reciprocal excursions and elongate portions to present an acoustic energy projectng surface facing radially outwardly.

16. A transducer according to claim 15 in which the projecting means further includes a resilient boot covering each set of projection strips in a sealed relationship to define a chamber between each set of strips and the thin walled tube to ensure the responsive transmission of acoustic energy.

17. A transducer according to claim 7 further including:
means coupled between the cylindrically shaped shell and the projecting means for ensuring responsive reciprocable displacements of the projecting means.

18. A transducer according to claim 17 in which the ensuring means is linkage reaching from the cylindrically shaped shell to the projecting means.

19. A transducer according to claim 18 in which the projecting means is at least one pair of opposed disc shaped members having a portion resiliently joined along their outermost periphery, the first of which is connected to the thin walled tube and the second of which is coupled to the cylindrically shaped shell via the linkage, both members are provided with a transverse opening in communication with the passageway of the thin walled tube to allow the flow of cooling water therethrough.

20. A transducer according to claim 19 in which the resilient portion of the disc shaped members seals the interior to enable the responsive transmission of acoustic energy.

21. In a magneto motivated transducer of acoustic energy having DC excited stator windings and AC excited reciprocator windings an improvement therefor is provided comprising:
helically extending poles for the stator and the reciprocator are fashioned from a sandwiched laminate of ferromagnetic sheets bonded together by a dielectric adhesive, the orientation of the bonded laminations on the stator poles and the reciprocator poles substantially parallel to the orientation of the stator windings and reciprocator windings, respectively.

22. An improved magneto motivated transducer according to claim 21 further including:
a cylindrically shaped shell of highly magnetic metal provides a mounting surface and magnetic flux path for the helically extending stator poles and reciprocator poles to reduce the magnitude of eddy currents where the flux makes a right angle turn from a pole to the shell and from the shell to a pole.

23. An improved magneto motivated transducer according to claim 22 in which the cylindrically shaped shell is made from a nickel iron or silicon iron alloy.

* * * * *